United States Patent [19]
Weiner et al.

[11] Patent Number: 5,695,345
[45] Date of Patent: Dec. 9, 1997

[54] SYNCHRONIZED COMBINED SOUND AND SIGHT ENTERTAINMENT AND EDUCATIONAL SYSTEM

[76] Inventors: Avish Jacob Weiner, 12 Boyer, 69127 Tel Aviv; Michael Ganor, 27 Shocken, 66532 Tel Aviv, both of Israel

[21] Appl. No.: 653,033

[22] Filed: May 24, 1996

[51] Int. Cl.⁶ .................................................. G09B 19/00
[52] U.S. Cl. ..................... 434/317; 434/308; 434/402; 434/409; 434/426
[58] Field of Search .................... 434/308, 309, 434/317, 311, 322, 323, 333, 335, 342, 348, 363, 364, 365, 402, 404, 426

[56] References Cited

U.S. PATENT DOCUMENTS

| | | | |
|---|---|---|---|
| 3,991,498 | 11/1976 | Beach | 434/426 |
| 4,573,928 | 3/1986 | Seki | 434/348 |
| 4,778,391 | 10/1988 | Weiner | |
| 4,802,693 | 2/1989 | Brown | 434/426 |

Primary Examiner—Lynne A. Reichard
Assistant Examiner—Glenn E. Richman
Attorney, Agent, or Firm—Mark M. Friedman

[57] ABSTRACT

An audiovisual device for displaying a visual image while simultaneously sounding out a corresponding audio message. The device includes base unit and a number of cartridges which fit into the base unit. Each of the cartridges includes a housing featuring a window, a pair of substantially parallel rods which are rotatably mounted within the housing, and a printed substrate, such as paper or plastic, mounted on the rods so that the substrate can be scrolled for the purpose of displaying portions of the substrate through the window in the housing. The base unit includes a driving mechanism for engaging and rotating the rods of the cartridge and a frame locator system for accurately locating a selected portion of the substrate in the window. Finally, the base unit includes a suitable speaker for producing sounds corresponding to the displayed portion of the substrate.

15 Claims, 13 Drawing Sheets

SYNCHRONIZED COMBINED SOUND AND SIGHT ENTERTAINMENT AND EDUCATIONAL SYSTEM

FIELD AND BACKGROUND OF THE INVENTION

The present invention relates to an entertainment and/or educational system featuring combined sound and sight.

It is well established that combining a visual stimulus with a corresponding aural stimulus greatly enhances the efficiency of information transmission and communication. The combination of sound with images, or audiovisual presentation, has been widely used in the fields of entertainment and education.

More specifically, a number of 'talking books' have been proposed. Typically, these devices are book-like structures which include certain embedded electronic components which, upon the turning of the page, or some similar activity, sound out a message which is related to the current page. One example, among many, of a talking book is disclosed in U.S. Pat. No. 4,778,391, in which is disclosed a talking book wherein a sound producing unit is connected to a book which includes a memory for storing signals related to the sounds to be produced.

Conventional talking books such as those disclosed in U.S. Pat. No. 4,778,391 suffer from a number of limitations and disadvantages. Among these is the fact that the books are structurally complex which forces the user to place the book on a flat and steady surface, such as a tabletop, in order to be operational. Another disadvantage is that it is relatively difficult and complex to identify the page which is being viewed so that either a complicated and unreliable system is included to automatically identify the page or this feature is foregone and the user must manually indicate to the device the page he is currently viewing. Furthermore, the very act of turning pages of a book is an act which is only mastered at the age of two or three so that younger children are unable to effectively utilize such talking books.

In an attempt to overcome some of these disadvantages certain talking books have been developed which contain the sound producing unit. One of the difficulties with such devices is that the portion of the device which produces the sounds is dedicated to the particular book in question so that, once the user has tired of the book, the device is no longer useful. Because the electronics are dedicated to the particular book, if one wishes to have a large set of talking books, one is obligated to purchase a large number of talking books, each with its own electronics. Such a purchase could require a relatively large expenditure, especially considering the fact that conventional talking books are fairly fragile and prone to tearing or other forms of destruction.

Because they require a relatively high skill level especially in the turning of pages, presently available talking books are limited to use by older children. There is, however, a need to start the book learning process of an infant as soon as possible after birth. It is well known that the ability to learn generally diminishes with age so that there is great importance in getting the very young child to start using, and learning from, book, as early as possible. Similarly, there is great importance in being able to readily raising the level of the material being taught as well as in the increasing of the complexity of the device being used to effect the learning process.

There is thus a widely recognized need for, and it would be highly advantageous to have, a device which will provide, relatively inexpensively and with the active participation and control of the user, a virtually unlimited number of rugged and long lasting 'talking books', as well as various audiovisual games and the like. The proposed 'talking book' would make it possible for a the child to go through the book at his own pace and using appropriate skill levels both in the materials being presented and in the operation of the device. The basic device, or versions of it, can accompany the child for many years and can be used to present a wide variety of educational and/or entertainment experiences.

SUMMARY OF THE INVENTION

According to the present invention there is provided an audiovisual device for displaying a visual image while simultaneously sounding out a corresponding audio message, comprising: (a) a plurality of cartridges each of the cartridges including: (i) a housing featuring a window; (ii) a pair of substantially parallel rods rotatably mounted within the housing; and (iii) a substrate featuring visual information, the substrate being scrollably mounted on the rods for display of portions of the substrate through the window; and (b) a base unit formed with a cavity dimensioned to accommodate one of the plurality of cartridges, the base unit including: (i) a driving mechanism for engaging the rods and for rotating at least one of the rods; (ii) a frame locator system for accurately locating a selected portion of the substrate in the window; and (ii) sound producing means for producing the corresponding audio message.

Also according to the present invention there is provided an activity center, comprising: (a) a housing featuring a plurality of activities, one of the activities being an audiovisual device for displaying a visual image while simultaneously sounding out a corresponding audio message, the audiovisual device including: (a) a housing featuring a window; (b) a pair of substantially parallel rods rotatably mounted within the housing; (c) a substrate featuring visual information, the substrate being scrollably mounted on the rods for display of portions of the substrate through a window; (d) a driving mechanism for engaging the rods and for rotating at least one of the rods; (e) a frame locator system for accurately locating a selected portion of the substrate in the window; and (f) sound producing means for producing the corresponding audio message.

According to further features in preferred embodiments of the invention described below, each of the cartridges further includes a memory for storing signals related to the audio message.

According to still further features in the described preferred embodiments the substrate includes location markers and the base unit includes a mechanism for detecting the location markers.

The present invention successfully addresses the shortcomings of the presently known configurations by providing, at low cost, a device capable of providing a variety large variety of durable and interchangeable 'talking books' and related systems, such as various audiovisual games, which cause the user to actively participate in the 'reading' of the device.

The present invention is of a base unit a large number of complementary interchangeable cartridges. Each of the cartridges include a scrollable substrate containing visual information. The user selects a specific cartridges and inserts the cartridge into the base unit. The user then controls the unit to display desired portions of the substrate. A speaker the base unit sounds out various messages and information which are related to the portion of the substrate being displayed. The sounds may be stored in the base unit but are preferably stored in some suitable fashion in the cartridge.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a synchronized combined sound and sight entertainment and educational system.

The principles and operation of a system according to the present invention may be better understood with reference to the drawings and the accompanying description.

Figure 1:
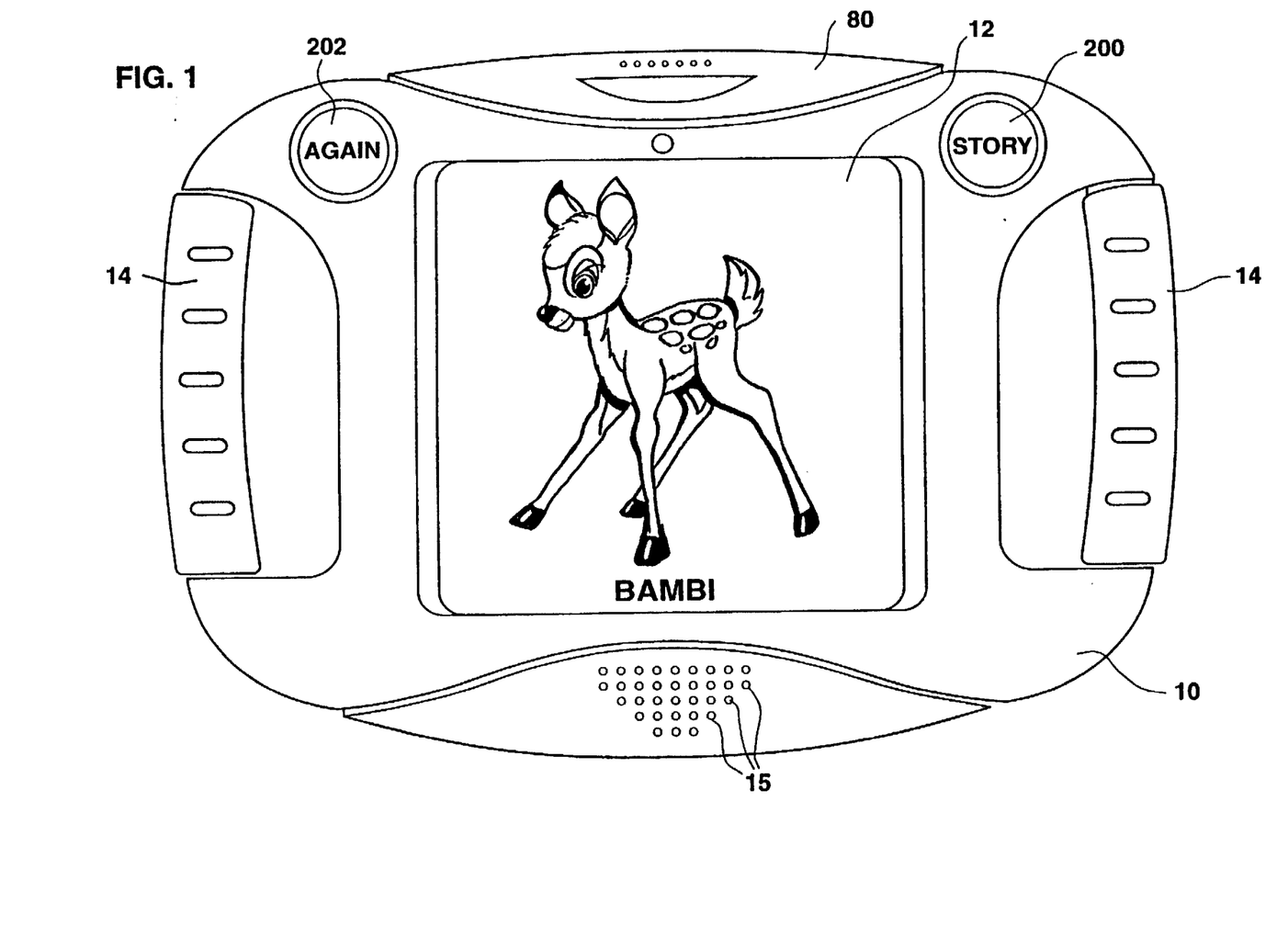
FIG. 1 is a front view of one embodiment of a device according to the present invention, including an inserted cartridge according to the present invention.

Referring now to the drawings, FIG. 1 illustrates one possible embodiment of a device according to the present invention. The device includes a base unit 10 and a plurality of cartridges, one such cartridge 12 is shown fully inserted into a cavity in base unit 10 designed to accommodate cartridge 12. Base unit 10 and cartridge 12 are described in more detail with reference to FIGS. 2–5.

Figure 2:
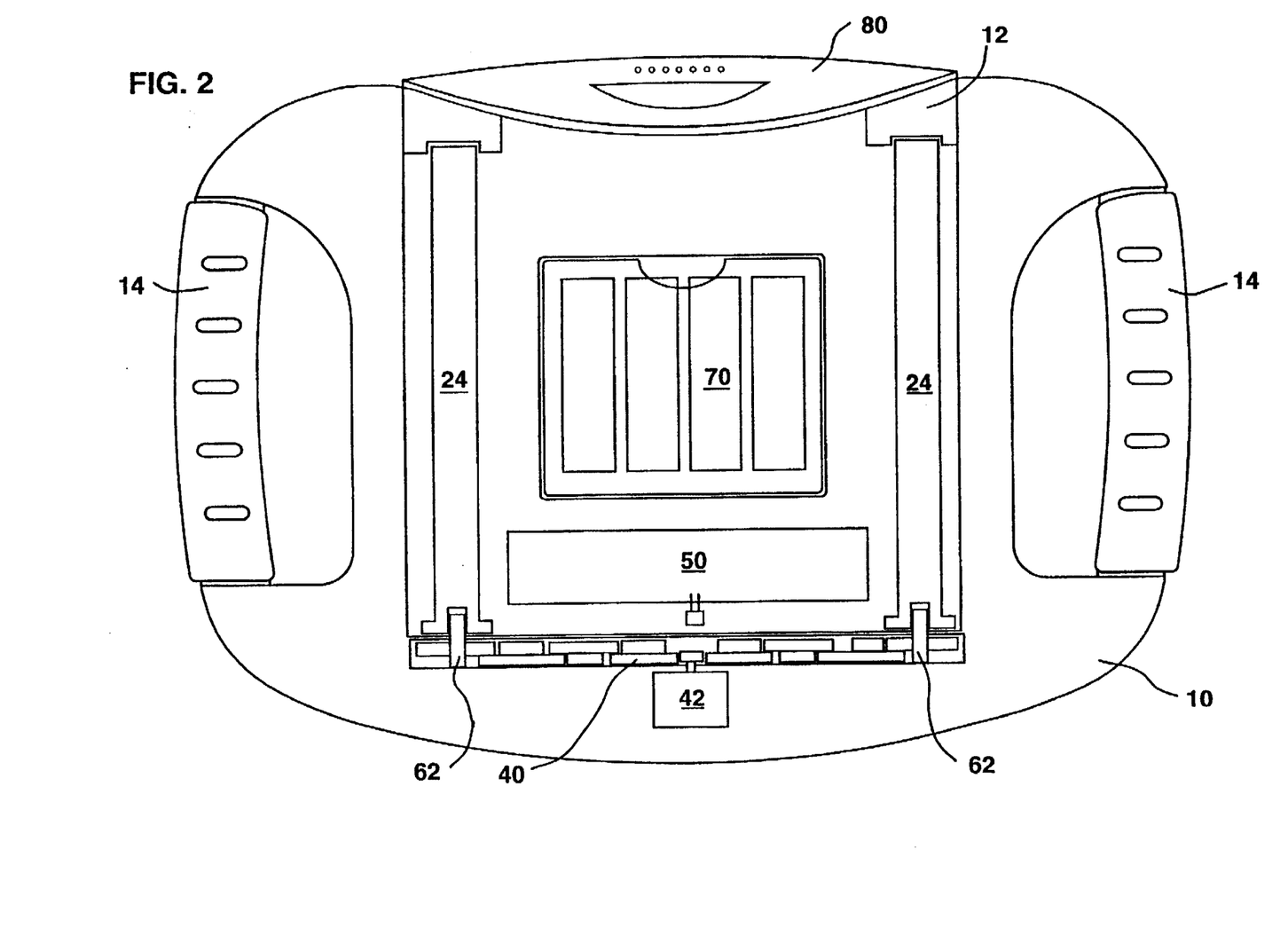
FIG. 2 is a partial cross-sectional view of the device and cartridge of FIG. 1.
Figure 3:
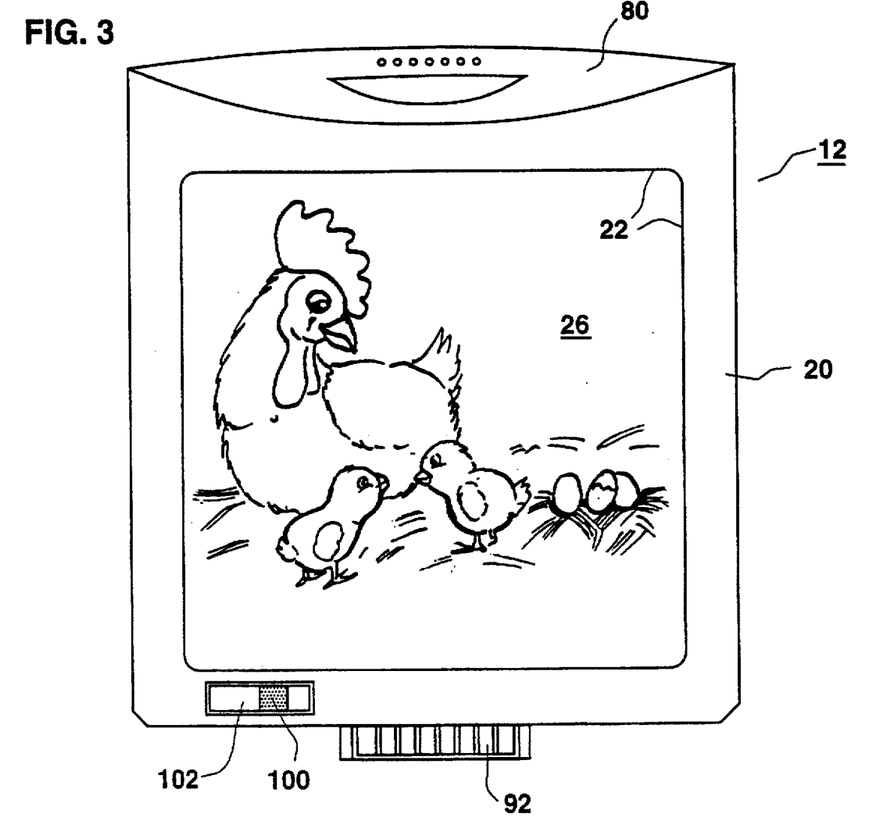
FIG. 3 is a front view of an illustrative embodiment of a cartridge according to the present invention.
Figure 4:
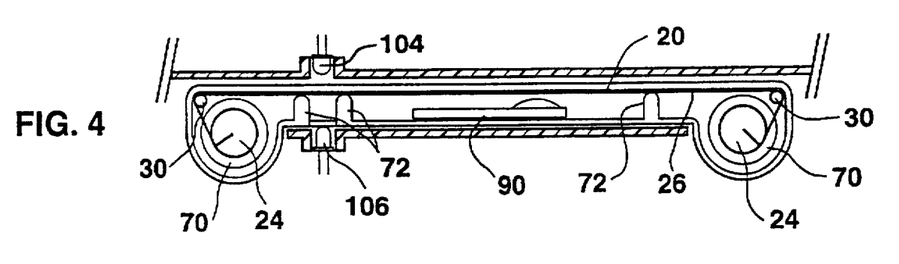
FIG. 4 is a top cross-sectional view of the cartridge of FIG. 3.
Figure 5:
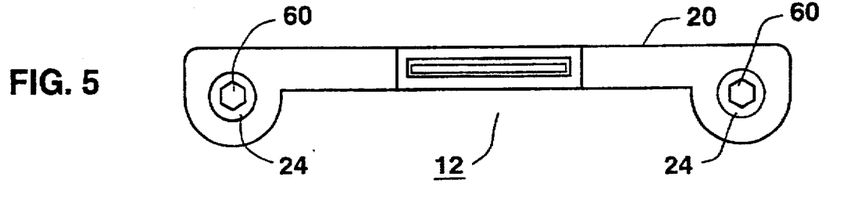
FIG. 5 is a bottom view of the cartridge of FIG. 3.

Shown in FIG. 2 is a partial cutaway view of the device of FIG. 1. FIGS. 3–5 show various views of cartridge 12. Base unit 10 preferably includes a pair of opposing handles 14 which facilitate the grasping of the device and which make it possible and ergonomically convenient to readily and accurately depress the control buttons using the user's thumbs, so that the user may be in any suitable position, including, sitting, lying down and the like. Base unit 10 includes a cavity into which cartridge 12 can be readily inserted and from which cartridge 12 can be readily withdrawn.

Cartridge 12 features a housing 20 which includes a window 22. Window may simply be a portion of cartridge 12 where housing 20 is absent or, preferably, is a window made of a suitable transparent material, most preferably clear plastic, so as to permit the viewing of the substrate in the window while still preserving the cartridge in a sealed condition so as to preserve its contents. Base unit 10 also features an opening which substantially matches window 22 of cartridge 12 so that the displayed portion of the substrate is visible to the user. The opening in base unit 10 may also be simply a cutout or may be defined by a transparent material, such as a suitable clear plastic. In some embodiments, the transparent material may be a touch screen to enable the user to control the device through the touching of the screen, as described below.

Cartridge 12 further includes a pair of substantially parallel rods 24 which are rotatably mounted within housing 20. Mounted on rods 24 is a substrate 26, such as paper but preferably a suitable plastic, most preferably a transparent plastic. Substrate 26 features visual information, such as various printing, for example as in FIG. 3. Substrate 26 is mounted on rods 24 in such a way as to enable substrate to be scrolled from one rod to the other.

Rods 24 and substrate 26 are located so that portions of substrate 26 can be placed in window 22 for viewing by the user. Preferably, a pair of guide rods 30 (FIG. 4) are used to ensure that substrate 26 is properly presented in window 22 regardless of the effective radius (i.e., the radius of the rod itself plus the thickness of the substrate) of each of rods 24 at any given instant. To ensure that substrate 26 does not slide up or down along rods 24 so that substrate 24 stays at the proper orientation, a pair of caps 70 are preferably, one at each end of each rod 24. Caps 70 have a larger radius than the effective radius of rod 24 and substrate 24 so that substrate 24 is prevented from sliding up or down along rod 24. To further ensure that substrate 26 does not sag or drift away from window 22, one or more guiding arms 72 (three are shown in FIG. 4) may be provided. Two or more of guiding arms 72 may concurrently serve to prevent stray radiation from entering detector 106 and thereby adversely affect the accuracy of the substrate location mechanism.

To further ensure that substrate 26 stays properly oriented with respect to window 22, it is desirable to connect substrate 26 to each of rods 24 in a proper fashion. FIGS. 13–16 show one way by which this can be accomplished. Rod 26 is preferably made of two substantially semi-cylindrical portions which pivotable relative to each other about their common boundary which may be an integral hinge 300. To connect substrate 26 to rod 24, rod 24 is first opened (FIG. 14) to expose its internals. These internal are shown in more detail in FIG. 15 which is a cross-sectional view. One of the semi-cylindrical portions features a protrusion 302 while the other includes a complementary recession 304. Substrate 26, the ends of which preferably includes spaced holes (not shown) located and dimensioned to fit over protrusions 302, is then placed over protrusions 302 and the two semi-cylindrical portions are pivoted so that they come together (FIG. 16), causing substrate 26 to be firmly and accurately grasped.

Figure 6:
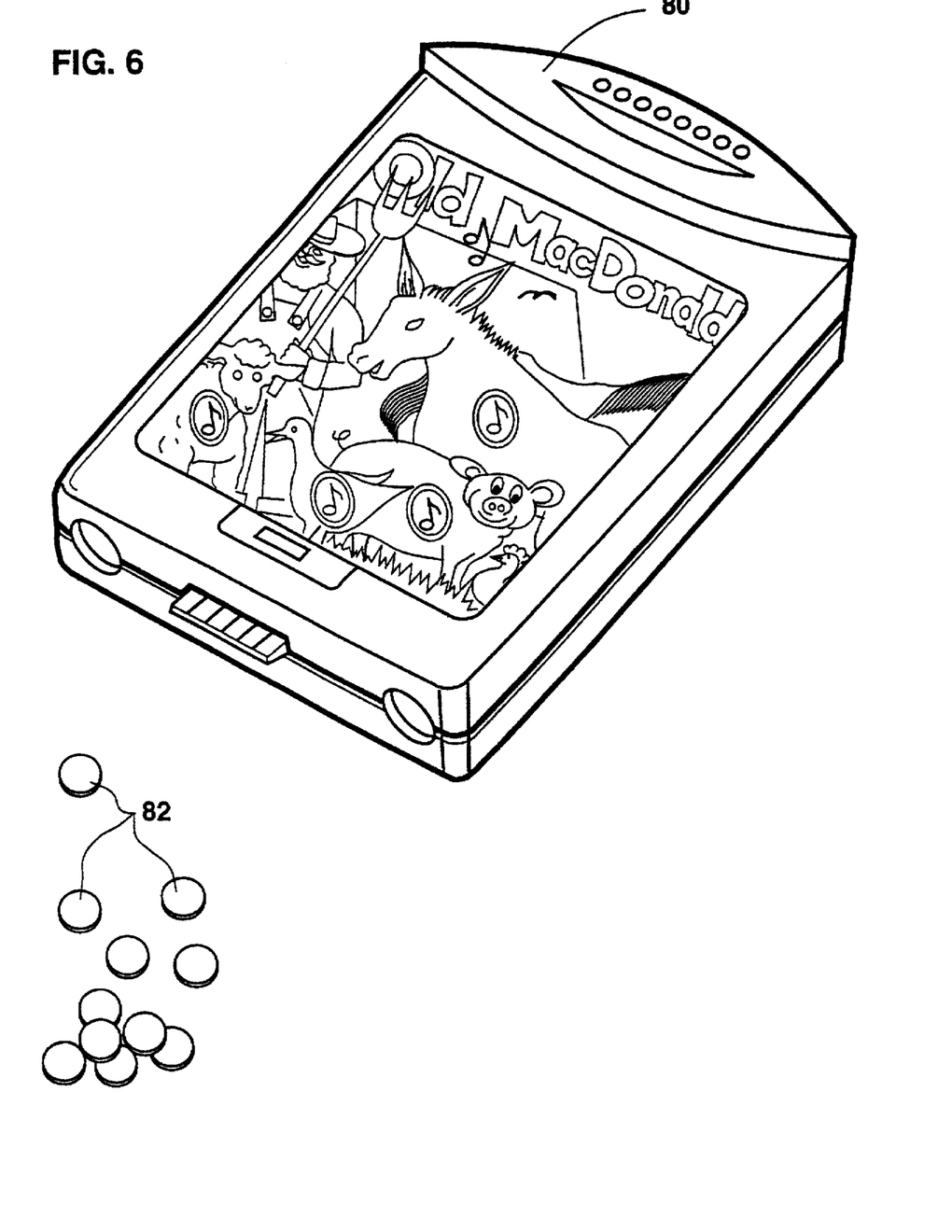
FIG. 6 is a perspective view of a cartridge such as that of FIG. 3–5.

Preferably, cartridge 12 includes a cartridge handle 80 which facilitates the insertion and, especially, the removal of cartridge 12. In certain applications (FIG. 6) it may be desirable to have a cartridge handle 80 which is formed with a cavity for housing game pieces 82 the like. Thus, when a touch screen is used, the device of the present invention may be used as a game board which, when a portion of the board is touched, produced various sounds.

Base unit 10 includes a driving mechanism 40, which may be mechanical but which are preferably electromechanical, for engaging rods 24 and for rotating one of rods 24. Thus, to effect forward motion of substrate 26 the first of rods 24 is rotated while the second is passive. Then, to rewind substrate 26 the second of rods 24 is rotated while the first is passive. Any suitable driving mechanism 40 may be used. Depicted schematically in FIG. 2 is a mechanism which includes a motor 42 and a series of gears which reduce the motor speed to a speed suitable for movement of substrate 26 and increase the applied torque. Although motor 42 can drive both rods 24 simultaneously, preferably, motor 42 alternately drives one or the other of rods 24.

Various driving mechanisms may be envisioned. One such mechanism is shown in FIGS. 17–24. As can perhaps best be seen in the exploded view of FIG. 23, the mechanism includes two sets of three interconnected gears 400. Each of the two sets is capable of driving one of the two rods 24 of cartridge 12. The drive mechanism further includes an floating gear 402 which is mounted no a pivot arm 404 which is, in turn, mounted on a shaft 406 which is rotated by the motor. Thus, when the motor is rotated in a first direction, floating gear 402 is pivoted toward one of the two nearest gear and engages it to turn one of the two rods, while, when the motor is rotated in the opposite direction, floating gear 402 is pivoted toward the other of the two nearest gear and engages it to turn the other of the two rods.

To allow driving mechanism 40 to properly engage rods 24, the bottom portions of rods 24 preferably feature depressions into which complementary protrusions of driving mechanism 40 are inserted. Thus, for example, as shown in FIG. 5, the bottoms of rods 24 include hexagonal depressions 60 while driving mechanism 40 include complementary protrusions 62 which, when cartridge 12 is fully inserted into base unit 10, are engaged to allow driving mechanism 40 to effectively and accurately rotate one or the other of rods 24.

Base unit further includes an electronic unit 50, preferably in the form of a microcontroller, which includes a sound producing element, such as a suitable speaker and the like, whose purpose is to produce an audio message which corresponds to the portion of substrate 26 being displayed in window 22. Base unit preferably includes sound openings 52 to allow the sound produced by the sound producing element better to reach the user.

Base unit 10 preferably also includes a suitable power source, such as a satiable battery 70 to power driving mechanism 40 and the sound producing means. Power may also be supplied through other means, such as an electrical wire connected to a household electrical outlet. The term 'power source' as used herein in the specification and claims is intended to include all the above and any other mechanisms for providing energy to the system.

Base unit 10 may include a suitable memory which includes the audio information for a number of cartridges 12 so that when a particular cartridge 12 is inserted in base unit 10 the audio information for that cartridge 12 are played. The memory may be electronic or may be of a different type. For example, the back of substrate may include coded conductive ink which, when substrate 26 is moved, can be detected by a suitable reader.

Preferably, each cartridge 12 includes its own memory unit 90 (FIG. 4). Cartridge 12 includes a plug member 92 which, when cartridge is properly inserted into base unit 10, connects with electronic unit 50 of base unit 10. In this way, the sound producing means use the memory of the cartridge to identify the cartridge and produce the various sounds. In addition, suitable mechanism are provided to ensure that the sound producing mechanism will not be actuated in the absence of a properly inserted cartridge.

The device of the present invention also includes a mechanism for properly locating a portion, or frame, of the substrate within the window. Preferably, substrate 26 includes location markers 100 (FIG. 3) at some suitable location. Locations markers may be used to indicate the beginning and end of substrate 26 as well as the location of the frames of substrate 26 and aids in properly locating substrate 26 for viewing. Location markers 100, which may be a series of marks of various shade or contrast, are made visible through the presence of a pair of opposing suitably sized secondary window 102 in the front and back surface of cartridge 12. Base unit is provided with a mechanism for detecting the presence and/or absence of location markers 100. The mechanism for detecting location markers 100 preferably includes a radiation source 104 (FIG. 4), which may passive, such as background light in the room or sunlight or which may be active, such as a LED and the like, and a corresponding detector 106 which are located so as to straddling substrate 26 across secondary window 102.

Thus, as substrate 26 moves, radiation source 104 and detector 106 work in conjunction with markings on substrate 26 to relay information useful in properly placing a portion of substrate 26, or frame, in window 22. Additional information which may included is the number, or other identifying information regarding the frame. To allow the information to be read even when substrate 26 is stationary, one could employ a plurality of radiation sources and corresponding detectors.

Preferably, at least a portion of the path leading from radiation source 104 to detector 106 is enclosed so as to prevent the entry of stray radiation which could adversely affect the precision of the mechanism. In addition, substrate 26 may include markers to indicate the page number. Having markers which indicate the page number serves to obviate the need to rewind cartridge 12 every time cartridge 12 is inserted into base unit 10.

Figure 7:
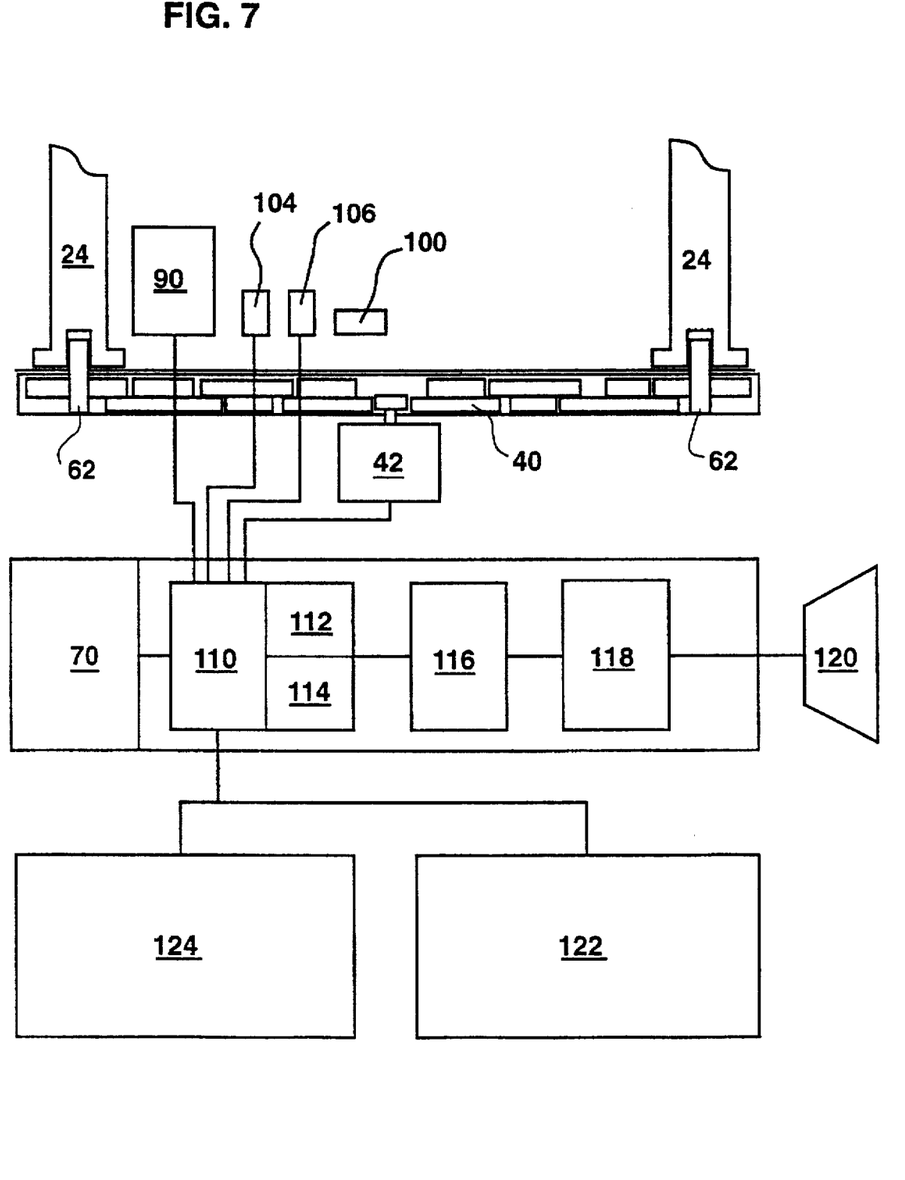
FIG. 7 is a schematic depiction of a device and cartridge according to the present invention.

FIG. 7 schematically summarizes various portions of an illustrative system according to the present invention. In addition to the items previously described, FIG. 7 shows a microcontroller 110 which includes ROM 112 and RAM 114. Also shown is a synthesizer 116 and amplifier 118 which drive a speaker 120. Finally, the input and control buttons 122 and touchscreen 124 are schematically presented.

Various versions of a device according to the present invention may be envisioned. Different versions of the base unit may be aimed at different age groups. Within each version of base unit, different cartridges may be made available targeted at different skill levels and interests.

Figure 8:
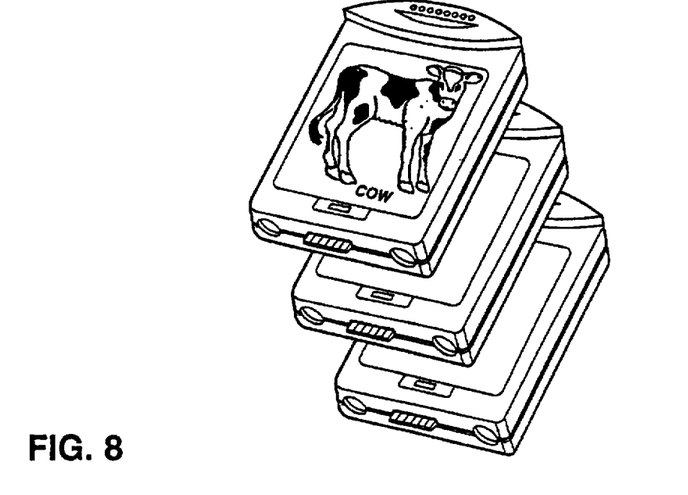
FIG. 8 shows a device and cartridges particularly useful for very young users.

One version of a base unit, intended for very young children, is shown in FIG. 8. Here only a pair of buttons is available—a STORY button 200 to advance the substrate to the next frame and sound out the appropriate sound message, and an AGAIN button 202 to repeat the sound message of the currently displayed frame without advancing to the next frame. When the end of the substrate is reached the substrate automatically rewinds to the beginning.

Figure 9:
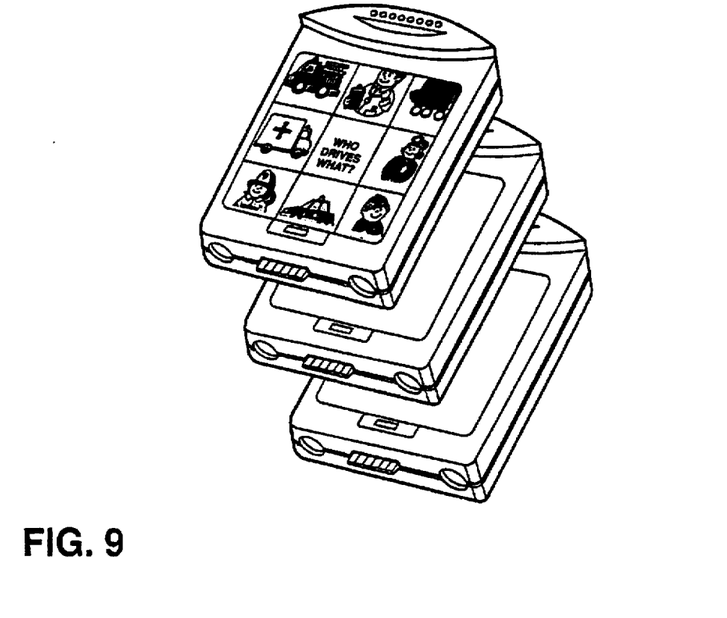
FIGS. 9 and 10 shows a device and cartridges designed for somewhat older users.

A more advance version of a base unit is shown in FIG. 9. Here a REW (rewind) button is provided to provide the more advanced user the option of rewinding the substrate at any time. Shown in FIG. 9 is a base unit featuring a touch screen which makes it possible to use the device as an audiovisual game board. Thus, the frame may ask the user a question to which he will reply by touching the correct portion of the frame. If the proper answer is given certain sounds will be produced by the device, otherwise, different sounds will be produced, perhaps urging the user to try again.

Figure 10:
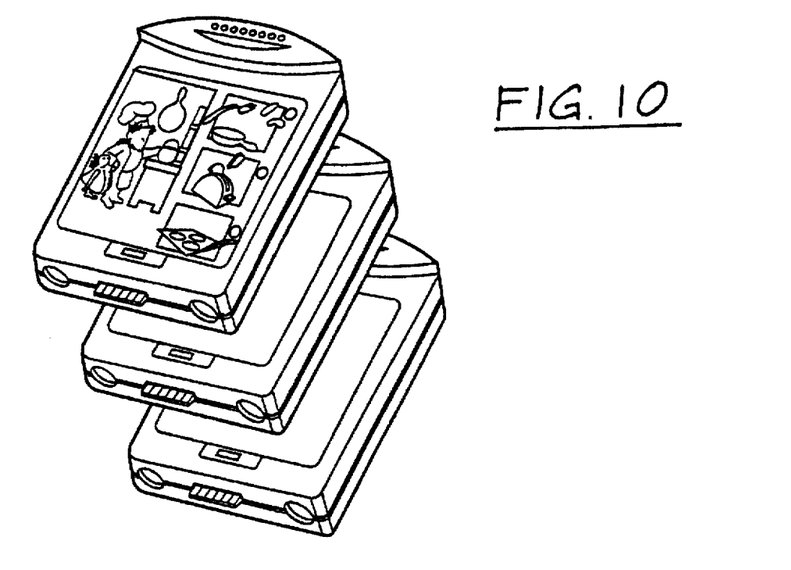

Another version of a base unit is shown in FIG. 10. Here, additional buttons are provided. The user is then able to respond to questions or other prompts by pushing the appropriate one of these buttons. This option may be used as an alternative to, or in addition to, a touch screen.

Figure 11:
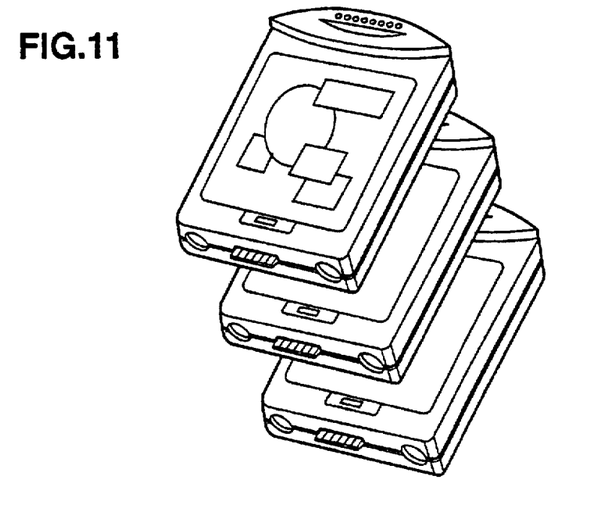
FIG. 11 shows an application of the present invention in the context of an activity center for infants.

Shown in FIG. 11 is a version of the base unit which is similar to that shown in FIG. 8 but which is enhanced through the addition of a number of other activities to form a complete activity center. This version is intended for infants.

Figure 12:
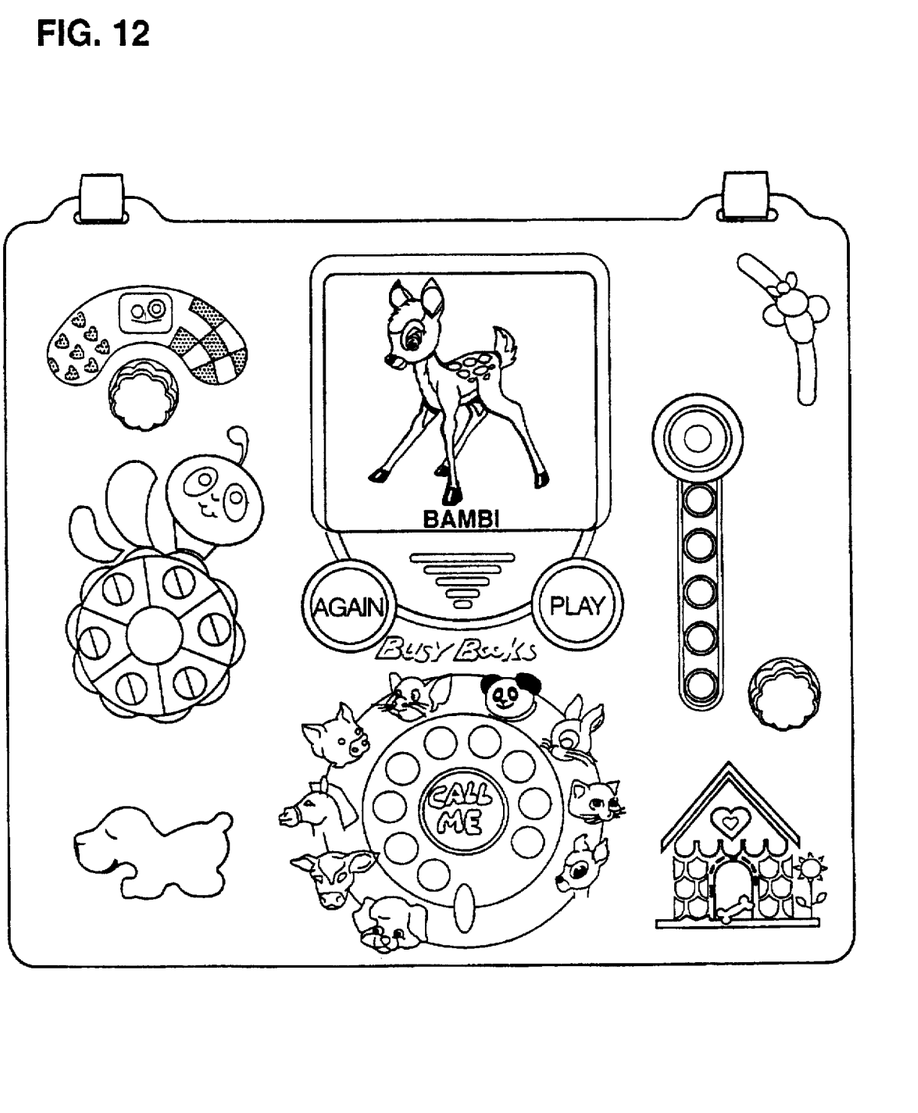
FIG. 12 shows another embodiment of an application of the present invention in the context of an activity center for infants.
Figure 13:
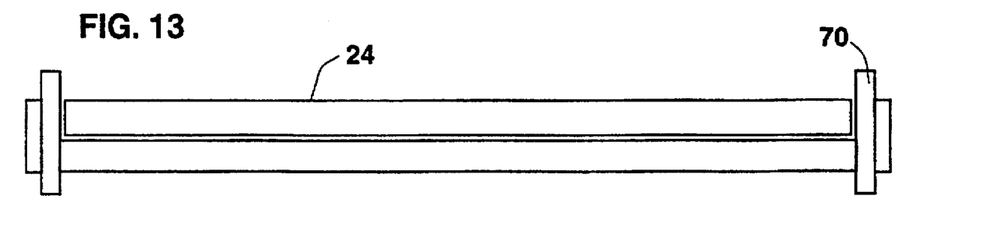
FIG. 13 shows a typical rod.
Figure 14:
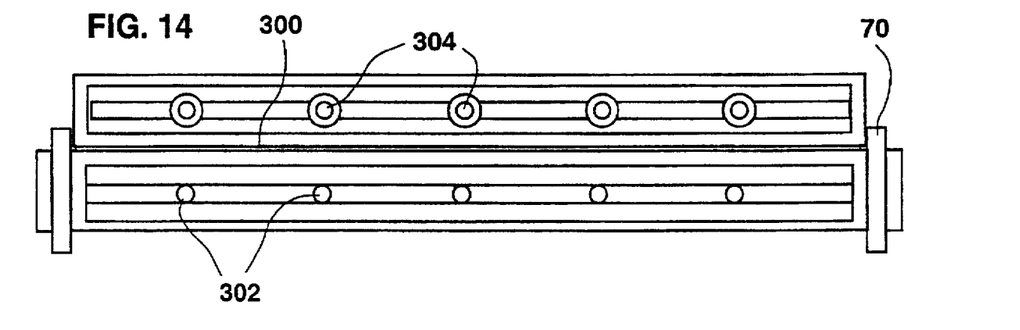
FIG. 14 shows the rod of FIG. 13 prior to insertion of the substrate.
Figure 15:
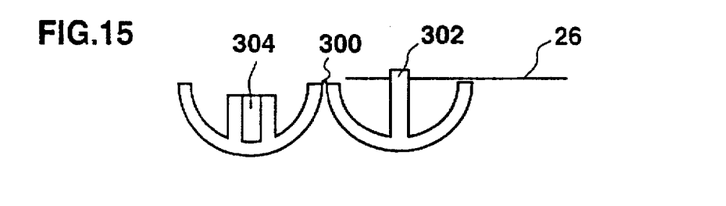
FIG. 15 is a cross-sectional view of the rod of FIGS. 13 and 14.
Figure 16:
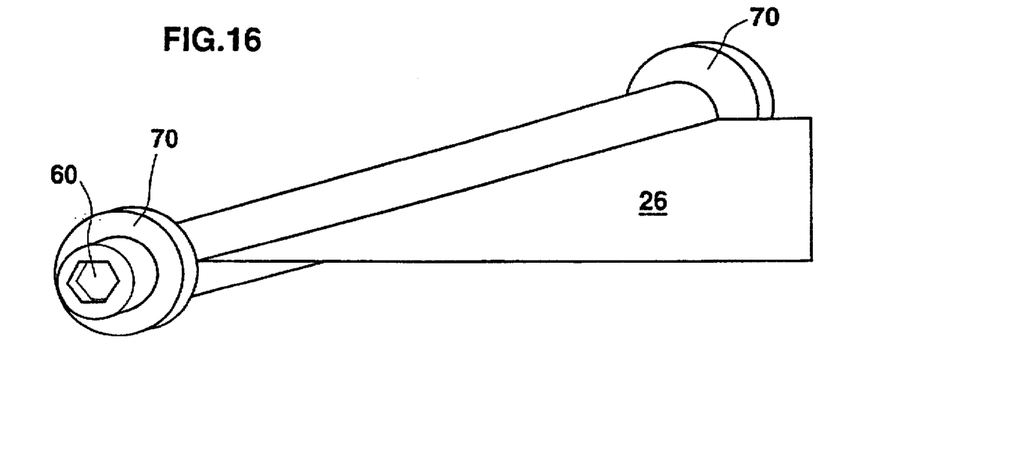
FIG. 16 shows the rod following the insertion of the substrate.
Figure 17:
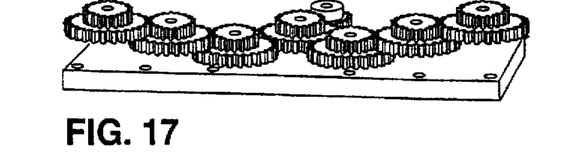
FIG. 17 is a perspective view of a portion of an illustrative driving mechanism.
Figure 18:
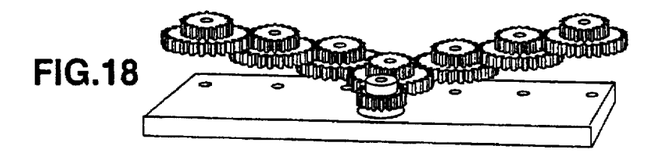
FIG. 18 is another perspective view of the driving mechanism of FIG. 17.
Figure 19:
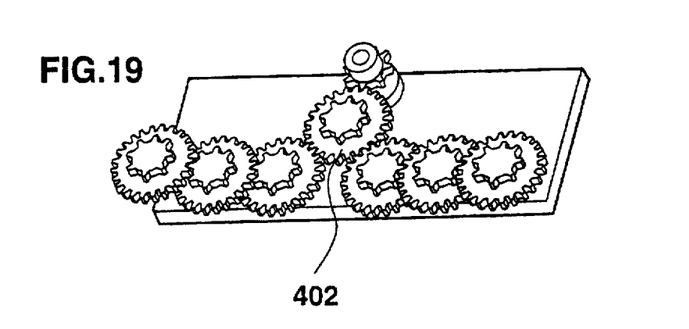
FIG. 19 is yet another perspective view of the driving mechanism of FIG. 17.
Figure 20:
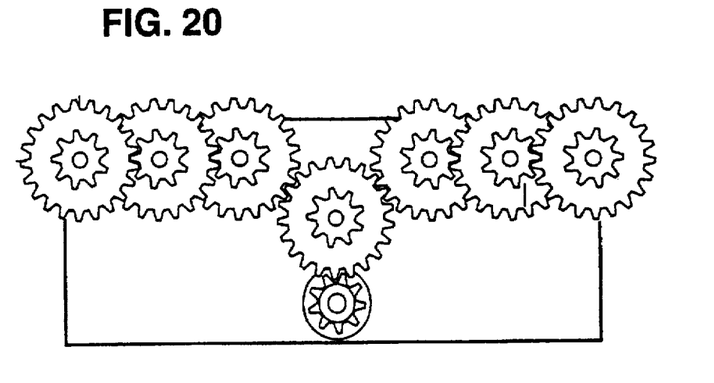
FIG. 20 is a plan view of the mechanism of FIG. 17.
Figure 21:
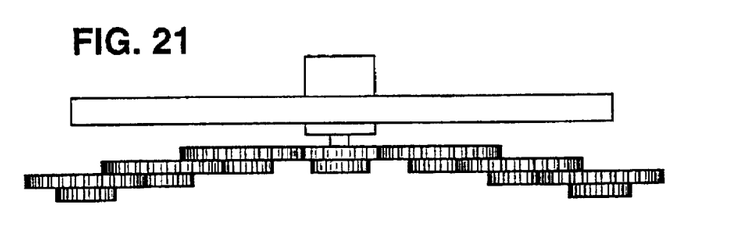
FIG. 21 is a top view of the mechanism of FIG. 20.
Figure 22:
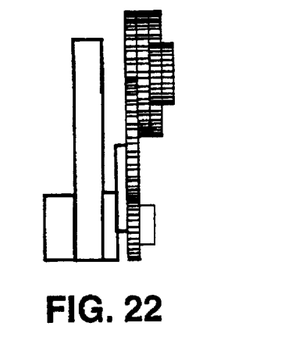
FIG. 22 is a side view of the mechanism of FIG. 20.
Figure 23:
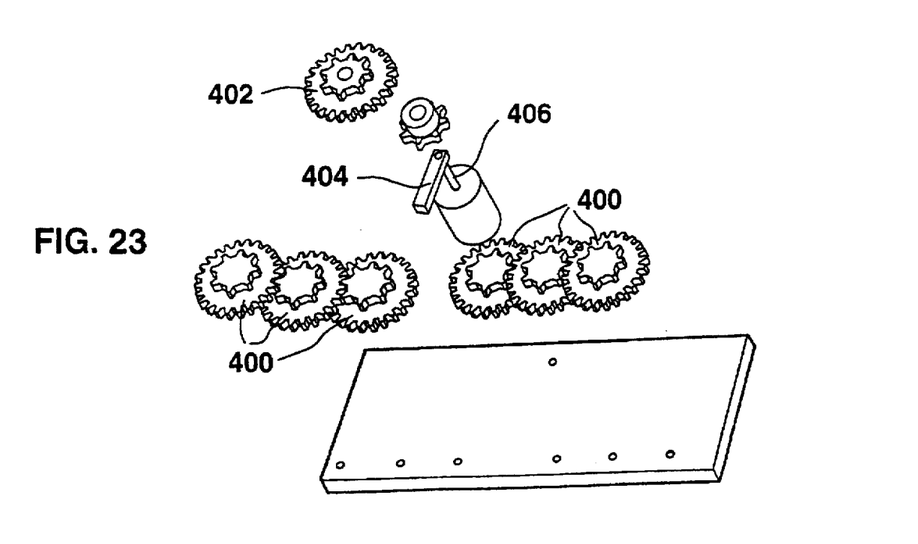
FIG. 23 is an exploded view of the mechanism of FIG. 17.
Figure 24:
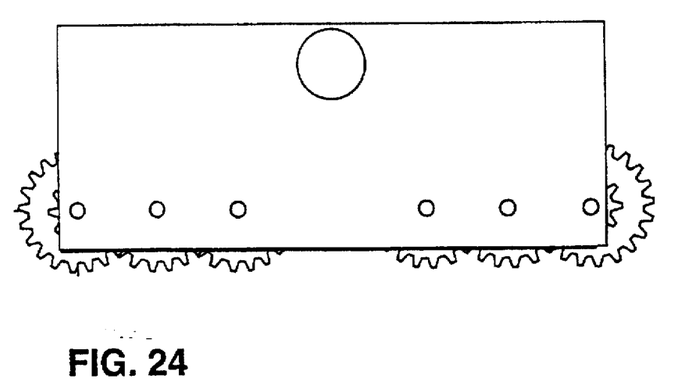
FIG. 24 is a plan view of the assembled mechanism of FIG. 23.

Another embodiment of the present invention intended for use by infants as part of an activity center is shown in FIG. 12. Unlike the embodiment of FIG. 11, here no cartridges are employed. Rather, the substrate and the memory is permanently mounted and sealed in the activity center.

Preferably, the activity center includes an additional activity whereby the user can use a telephone dial to dial a specific item, for example, an animal such as a horse, cow, rabbit, dog, etc. When a specific animal is dialed a signal is sent to the audiovisual device which causes the substrate to be moved to a suitable location and causes the sound producing mechanism to issue appropriate sounds. Thus, the telephone dial includes a number of dial stations, typically corresponding to the numerals 0 to 9. The dial features indications, such as pictures or drawings, which are associated with each of the dial stations. The dial is connected to the audiovisual device such that dialing the telephone dial to one of the activates the audiovisual device so as to present visual and audio information related to the associated indication. For example, dialing the cat will cause the audiovisual device to display a picture of a cat and to issue a number of meows.

While the invention has been described with respect to a limited number of embodiments, it will be appreciated that many variations, modifications and other applications of the invention may be made.

What is claimed is:

1. A audiovisual device for displaying a visual image while simultaneously sounding out a corresponding audio message, comprising:

(a) a plurality of cartridges each of said cartridges including:
  (i) a housing featuring a window;
  (ii) a pair of substantially parallel rods rotatably mounted within said housing; and
  (iii) a substrate featuring visual information, said substrate being scrollably mounted on said rods for display of portions of said substrate through said window; and (b) a base unit formed with a cavity dimensioned to accommodate one of said plurality of cartridges, said base unit including:
  (i) a driving mechanism for engaging said rods and for rotating at least one of said rods;
  (ii) a frame locator system for accurately locating a selected portion of said substrate in said window; and
  (ii) sound producing means for producing the corresponding audio message.

2. The device of claim 1, wherein each of said cartridges further includes a memory for storing signals related to the audio message.

3. The device of claim 1, wherein each of said base unit further includes a memory for storing signals related to the audio message of said plurality of cartridges and to the identity of each of said plurality of cartridges.

4. The device of claim 1, wherein said base unit further includes a power source for powering said driving mechanism and said sound producing means.

5. The device of claim 1, wherein said base unit features a pair of opposing handles.

6. The device of claim 1, wherein at least one of said cartridges features a handle to facilitate removal of said cartridge from said base unit.

7. The device of claim 1, wherein at least one of said cartridges features an internal compartment for storing small objects.

8. The device of claim 1, wherein said base unit features a button serving to advance said substrate and activate said sound producing.

9. The device of claim 1, wherein said base unit features a button serving to activate said sound producing means.

10. The device of claim 1, wherein said base unit further includes a microcontroller for controlling said driving mechanism and said sound producing means.

11. The device of claim 1, wherein said substrate includes location markers and wherein said base unit further includes a mechanism for detecting said location markers.

12. The device of claim 11, wherein said mechanism for detecting said location markers includes a radiation source and a detector straddling said substrate.

13. The device of claim 1, wherein said substrate includes a marker for indicating the page number.

14. The device of claim 1, wherein said base unit features a button serving to rewind said substrate.

15. The device of claim 1, wherein said base unit features a touch screen through which said substrate of said cartridge is visible through said window of said cartridge.

* * * * *